Aug. 11, 1964 A. G. MAKOWSKI 3,144,495
CONTAINERS AND METHOD OF MAKING
Filed Sept. 15, 1960 2 Sheets-Sheet 1
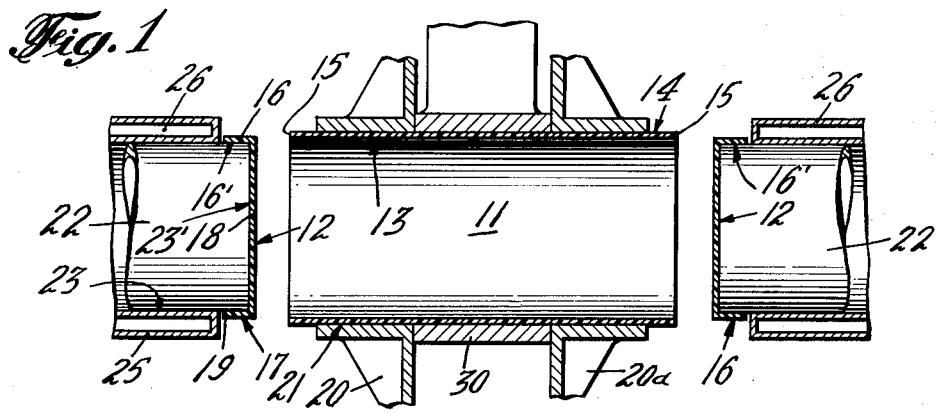
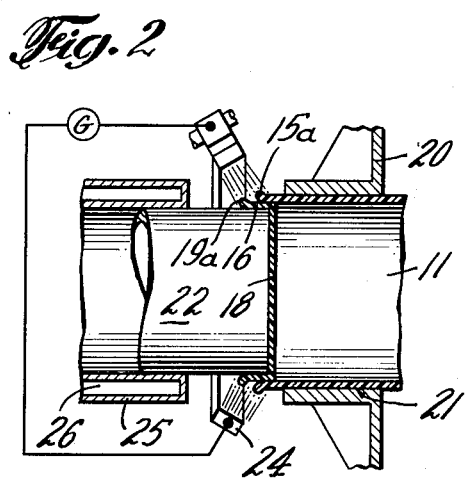
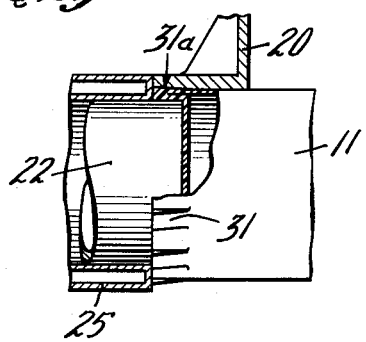
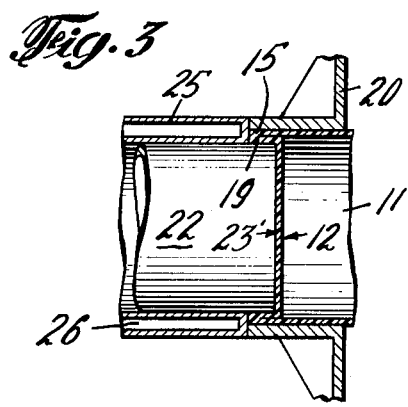
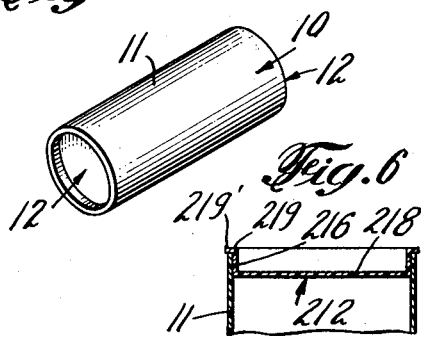
INVENTOR.
ALEXANDER GEORGE MAKOWSKI
BY Russell L. Root
George W. Reiber
ATTORNEYS

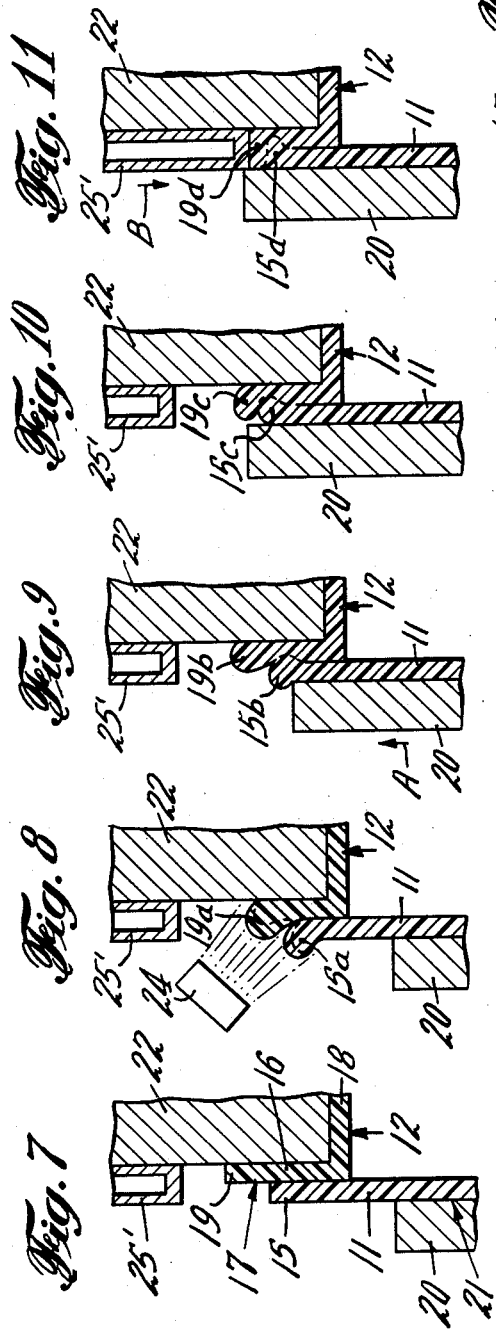
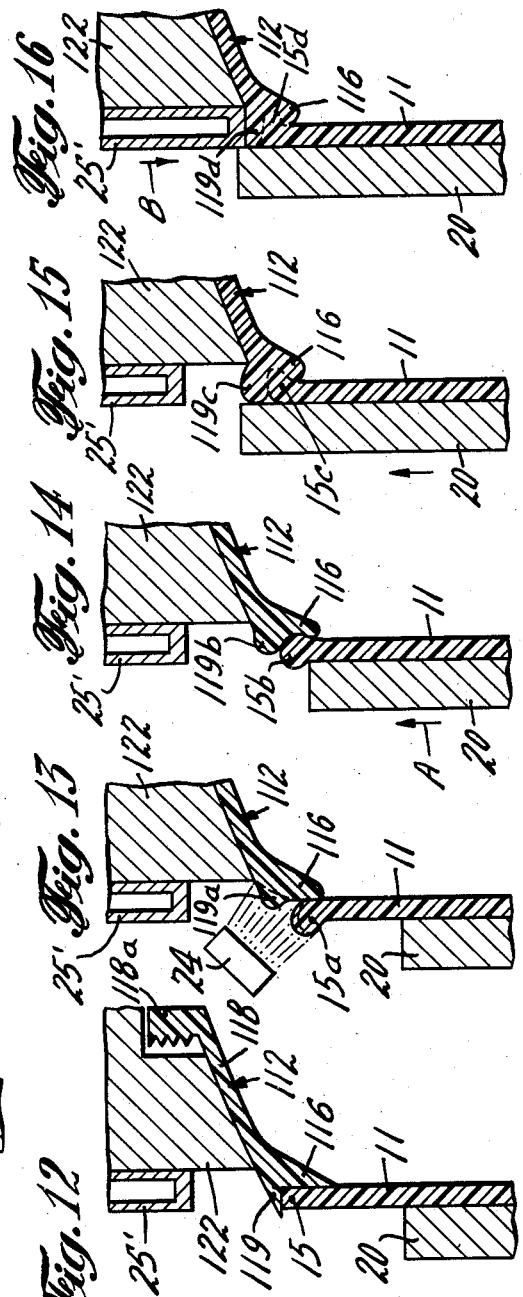

United States Patent Office 3,144,495
Patented Aug. 11, 1964

3,144,495
CONTAINERS AND METHOD OF MAKING
Alexander George Makowski, Fayville, Mass., assignor to American Can Company, New York, N.Y., a corporation of New Jersey
Filed Sept. 15, 1960, Ser. No. 56,267
8 Claims. (Cl. 264—248)

The present invention relates to forming a container by affixing a thermoplastic end member or closure to the end of an unstepped body of thermoplastic material, and to a container made by this method.

According to certain prior patents containers have ostensibly been constructed by heat sealing an end member to the end of a container body where the body was shaped to provide a transverse shelf or holding surface for receiving the end member and resisting endwise movement of the assembly. An end member and the container body were said to be formed from plastic materials capable of being joined by heat and pressure. The body of a container formed by these prior methods included an outwardly extended lateral shelf which required special handling or additional operations to form the same at the end of the body. The end member was formed wtih a lateral peripheral portion complementary to and engageable with the lateral shelf on the body. In the prior methods, after the extended lateral portions of the end and body were abutted against each other, the material was pressed together between opposing flat surfaces of dies, at least one of which was heated, so that a forged type sealed joint was sought to be obtained with the outwardly extended shelf on the body serving as a reaction surface to sustain the assembly against endwise motion in response to any axial sealing pressures exerted on the transverse end member.

Certain other plastic containers have been formed by placing a cup-shaped end member in the end of a tubular body, heating the adjacent margins to softness, and then bringing about a certain amount of outward flanging of the end of the container and the end member as the softened margins thereof are consolidated by bringing a cooled flat surface axially against them to cause them to merge and set.

The prior processes mentioned above were deficient in several respects. In the former case the preshaping of the body required by the process was so costly as to disqualify it for many commercial purposes and the application of heat and pressure, in the manner disclosed, was wholly ineffective for many plastic materials, and especially polyethylene, because of the tendency for the softened material to stick to the heated metal elements. In the latter case an effective seal could often be secured, but there was required a significant amount of operative know-how in connection with temperature control and exposure or heating time, and if the process was not performed with sufficient accuracy, insufficient sealing strength or somewhat erratic and unsightly shaping of the outwardly flanged seal area, or both could occur.

It is thus apparent that one of the main objects of the present invention is to overcome the deficiencies in the prior containers and the problems encountered in the method of manufacturing those containers.

Another object of the present invention is to provide a plastic container, especially of material having the physical properties of polyethylene, formed from an unstepped tubular plastic body of uniform wall thickness throughout its extent and at least one plastic end member inserted within the wall and sealingly affixed thereto in a firm, reliable and sightly manner.

A further object of the invention is to affix a plastic end member in a tubular plastic body by providing the end member with a rim complementary to the wall of the body, inserting the end member partially into the body until the margins of the rim and wall are proximate to each other, rendering the margins fused or softened, merging the material of the softened margins together, and confining the softened margins while simultaneously molding them into an integral joint without the necessity for holding the tube against axial displacement, or in case axial displacement tendencies are present, then holding the tube against such displacement without recourse to the forming of lateral projections or steps on the exterior thereof.

A further object of the invention is to form a container by inserting cup shaped plastic end members into a tubular plastic body until the margins of the respective ends and body are proximate and axially spaced from each other, simultaneously melting all free edges, moving the molten portions together and confining the respective molten portions between cool mold elements to mold and shape them and to cause them to cool to affix the cup shaped end members in the unstepped tubular wall of the body in firmly sealed relation thereto.

A further object of the invention is to provide a container made in accordance with the present method or process.

Additional objects, features and advantages of the invention will appear hereinafter as the description proceeds.

In the drawings:

FIGURE 1 is a sectional view illustrating the supporting of the end members and the tubular body preparatory to inserting the end members in the tubular body;

FIG. 2 is a fragmentary sectional view demonstrating the relative positioning of the end member and body for the heating operation wherein the end is inserted in the tubular body and further illustrating the shape assumed by the margins after they have been heated and become softened;

FIG. 3 is a fragmentary sectional view illustrating the position of the body and end member during the confining and molding of the softened margins;

FIG. 4 is a perspective view of a container formed in accordance with the invention;

FIG. 5 is a fragmentary sectional view illustrating an alternate form of the sealing tools for simultaneously molding a decorative feature into the container margin;

FIG. 6 illustrates an alternate form of end member which may be secured to a tubular body by the process of the invention;

FIGURES 7 to 11 inclusive are fragmentary enlarged sections illustrating in sequence various steps in the process of the invention, and the shapes assumed by the margins at progressive intervals in the process and showing an alternate form of collar and sleeve interaction; and FIGURES 12 to 16 inclusive are views similar to FIGS. 7 to 11 respectively, but illustrating the shape assumed by the margins at progressive intervals in the process of applying still another form of end member to the tubular body.

A container, for example, a container 10 in FIG. 4 is constructed from an unstepped hollow tubular shaped wall or body 11 of any desired cross sectional shape and a pair of end members 12, 12. The wall or body 11 may be formed in advance by extruding a suitable plastic material, preferably one having the physical properties of polyethylene into a tube of the desired cross sectional shape and cutting the tube to a predetermined length. Such an unstepped body 11 has a uniform thickness throughout its length or extent and is free of lateral projections, shoulders, steps, flanges or portions extending outwardly around the periphery thereof. The particular unstepped body 11 illustrated in FIG. 1 is formed from a tube having a cross sectional shape which is cylindrical and has a smooth internal surface 13 and a smooth external surface 14. For purposes of description the tubular body 11 is designated as terminating at its opposite ends in marginal portions 15, 15.

The end member 12 is formed by injection molding or any other suitable well-known method of forming articles from material compatible with or the same as that in the body 11. The end member 12 has a rim 16 of a uniform thickness throughout its axial extent provided with an inner surface 16′ and also provided with an outer surface 17 complementary with the internal surface 13 of the body 11. Thus, in the particular design illustrated in FIGURES 1 to 4 and 7 to 11, the end member 12 is cup shaped and has an outside diameter substantially equal to the internal diameter of the cylindrical wall of body 11. In actual practice the rim 16 has a thickness at least approximately equal to, and preferably substantially equal to, the thickness of the body 11. For descriptive purposes the rim 16 is designated as being integrally joined at one axial end thereof with and extending from a disc portion 18 of the end member 12 and terminating at the other free axial end thereof in a marginal seal portion 19, and has a free sliding fit within the body tube 11.

After the body 11 and the end member 12 are individually formed, the next step in the method of making the container is to affix the end 12 to the body 11. The affixing of the end 12 in the body 11 includes the positioning of the body 11 in a collar 20 (FIGURES 1 and 7) having an internal surface 21 engaging the external surface 14 of the body 11 throughout its periphery. In actual practice the collar 20 may be a split collar with the parts of the split collar movable relative to each other so that they may be separated for insertion of the body 11 into the collar 20 in a path transverse to the length of the body 11. As illustrated in FIGURES 1 and 7 the body 11 is positioned in the collar 20 with the free end margin 15 externally of and free of engagement with the collar 20. The end member 12 is slipped or positioned over the end of a plunger 22 having an outer cylindrical surface 23 complementary with the inner surface 16′ of the rim 16 and an end surface 23′ abuttable against the disc portion 18 at least throughout a peripheral portion thereof next adjacent the rim 16, as shown in FIG. 1, and is held there by friction fit as shown, or by a vacuum connection if desired. The plunger 22 is positioned in coaxial alignment with the collar 20 so that the end member 12 and the body 11 are in coaxial alignment with each other (FIG. 1).

The body 11 and the end member 12 are then juxtaposed with the collar 20 and the plunger 22 respectively, and the collar 20 and the plunger 22 are finally so positioned relative to each other that, as illustrated in FIGURES 2 and 7 the disc portion 18 of the end member 12 is disposed interiorly of the body 11 with a positioning portion of the rim 16 within the body 11 and the balance, in the form of marginal seal portion 19, extending outwardly from the body margin 15 in a direction axially of the body 11 and free of engagement with the body 11. At this time the margin 15 of the body externally encompasses and is at least proximate to or touches the outer surface 17 of the rim 16 at a location between the margin 19 and the disc portion 18 of the end member 12. Thus margins 15 andn 19 are in close proximity with each other and are axially spaced apart so that they may be free of each other while they are simultaneously heated by a suitable heater means.

The margin 15 and the margin 19 are next simultaneously rendered soft and unitable by applying heat thereto from the heater means, for example an electrically operated radiant ring heater 24 illustrated in FIGS. 2 and 8. The margins are illustrated in FIGURES 2 and 8 in the softened condition wherein they have formed themselves into proximate and separate beads 15a and 19a which normally tend to deflect slightly in directions outwardly from the plunger 22. This is apparently because the heating effect tends to cause the plastic material to shrink back towards a more basic form which it held prior to injection or extrusion, with a consequent lateral thickening or bulging of the thin sections. This bulging, of course, causes a radial inward force which swings the beads 15a and 19a outwardly as shown. At the same time the surface areas of the beads closest to the heat and located substantially in the portions indicated by dotted lines in FIG. 8, become softened sufficiently to become tacky and weldable one to the other.

After the margns have been softened to render them unitable, relative movement between a confining sleeve 25 (FIG. 3) or 25′ (FIG. 11) closely encircling the plunger 22, the plunger 22 and the collar 20 results in the closing of a ring mold about the softened margins 15a and 19a and a confining and compression of the softened material into the desired form while simultaneously merging and uniting weldable portions of the softened margins.

These progressive relative movements occur between the preliminary position illustrated in FIGURES 2 and 8 and a final position illustrated in FIGS. 3 and 11. In FIG. 9 an arrow A indicates movement of collar 20 towards the plunger 22 to move the softened margin or bead 15a towards the margin 19a until they assume the new shapes and positions as indicated at 15b and 19b. It will be noted that the bead 15b is actually pressed into and forms an indentation in the softened portions of the rim 16 next adjacent. FIG. 10 illustrates the full interfitting of softened margins, now designated 15c and 19c and the shape of each after they have been moved together upon full movement of collar 20. It will be noted that bead 19c overlies bead 15c and that the two beads are aligned, at least partially, axially of each other with their weldable portions in contact. Thus far, collar 20 has moved relative to and at least to the end of body 11 so that margins 15c and 19c are disposed substantially within collar 20.

The next occurrence in the progression is the movement of sleeve 25 in the direction of arrow B in (FIG. 11) and towards collar 20. This relative movement continues until the parts have attained the respective positions illustrated in FIG. 3 or FIG. 11.

As illustrated in FIGURES 3 and 11, the relative movement of the collar 20, plunger 22 and sleeve 25 or 25′ has contained until the space between collar 20 and plunger 22 is bridged by sleeve 25 (FIG. 3) or entered by sleeve 25 (FIG. 11). The outer surface of plunger 22, the end surface of sleeves 25 or 25′ and the inner surface of collar 20 form a continuous inner mold surface which defines the shape which the marginal beads will assume as they are joined and cooled. In effect the relative movements of collar 20, sleeve 25 or 25′ and plunger 22, along with the non-heated portions of the body 11 and rim 16, have confined and thereby consolidated or united or caused the beads or margins, now designated 15d and 19d, to merge into a unitary seal structure. It will be noted that the manipulations have produced, automatically, a novel locking configuration having a substantial transaxial interface particularly adapted to provide a firm sealing action under the final pressure applied by the sleeve 25 or 25′ as it is moved to final position. The continuous inner mold surface is thus formed by having the sleeve 25 meet, match with, come into close proximity with, or abut against the collar 20 as in FIG. 3, or alternately to extend into the collar 20 as in FIG. 11. The margins 15d and 19d are thereby entirely confined, welded, and pressure formed in the space defined by the collective cooperation of the collar 20, the sleeve 25 or 25′ the plunger 22, and the proximate telescopically interfitted and infusible portions of the body 11 and the rim 16 of the end 12.

The collar 20, the plunger 22, and the sleeve 25 or 25′ are maintained at or below a temperature capable of solidifying the free margins 15d and 19d. The solidifying temperature is obtained and maintained by any suitable means, such for example running cool water through water passages in one or more of the collar, plunger and sleeve, including, for example, passage 26 in sleeve 25. While the margins are confined in the continuous inner mold surface and are subjected to the cooling temperatures they solidify into a sealed joint firmly connecting the body 11 and the end 12, resulting in the finished container 10 illustrated in FIG. 4. Axial displacement of the body-end member assembly resulting from axial pressure exerted thereon during relative movements of the collar, sleeve and plunger can be resisted either by having the dimensions of the plunger 22 and collar 20 designed so as to leave a gap slightly less than the combined wall thickness of body 11 and rim 16, whereby the body and rim are firmly gripped, or preferably by merely having a suitable abutment means simultaneously acting at the opposite end of the container. The latter is the case for example when two end members are applied simultaneously, as will presently be described.

In some instances it may be desirable to simultaneously affix a pair of end members to a common tubular container body. When the end members are identical to each other, as illustrated in FIG. 1, plungers and confining sleeves and collars may be identical with each other. For example, when a second end member 12 identical to the first end member 12, is to be fused to the opposite margin 15 of the body 11 at the same time as the first end member 12, a second plunger 22 encircled by a second confining sleeve 26 is axially aligned with the assembly at the opposite end of the tubular body 11 as shown at the right hand end of FIG. 1. Similarly a collar 20a extends about the tube 11 next adjacent the margin 15 in the same way the collar 20 extends about the tube 11 next adjacent the first-mentioned margin 15.

So that suitable relative movement between the respective confining sleeves, plungers and collars may be obtained, the tube 11 is preferably held in a holder 30 as illustrated in FIG. 1. The method of fusing the margins of the second end member 12 and the other end margin of body 11 is the same as the method previously described in detail for the first end so that no additional description is needed.

Alternatively, a decorative formation 31 may be formed into the fused joint in the container at the time of sealing as illustrated in FIG. 5. In this particular instance the decoration is obtained by providing decorative cavities or surface formations 31a on the inside surface of the collar 20. When the collar 20, plunger 22, and confining sleeve 25 are moved together to provide a continuous inner mold surface and to confine the fusible free edges of the wall 11 and the end member 12, the fusible material flows under pressure into the decorative cavities 31a and sets to form the desired decorative formations 31.

FIGURES 12 to 16 inclusive illustrate the progressive relative movements used in fastening an alternate form of end member 112 to the tube 11. In this instance the alternate end member 112 is convexed outwardly and includes a somewhat conical disc portion 118 which is provided at the center thereof with an outwardly extending threaded neck 118a. The end member 112 also has a peripheral margin 119 extending transversely and outwardly from the rim portion 116. As illustrated an alternate plunger 122 is used so as to provide a plunger capable of supporting the end 112. The supporting connection may be made in various ways, e.g. by threading onto the neck 118a, by friction with the neck, or, as would be used in the case illustrated, by suction or adhesion.

In carrying out the progressive relative movements which are substantially the same as used for the embodiment of FIGURES 1 to 3 or FIGURES 7 to 11 inclusive the tubular body 11 is placed in the collar 20 and the end member 112 is placed on the end of plunger 122. The sleeve 25′ extends about the plunger 122 as previously described. The relationship and position of the parts at the start of the relative movement and prior to heating is illustrated in FIG. 12. It is noted that margin 119 is in close proximity with margin 15 and that rim 116 extends into tube 11. While the body 11 and end member 112 are maintained in this position the margins 15 and 119 are heated to form beads 15a and 119a in FIG. 13. These beads 15a and 119a are illustrated in FIG. 13 in the softened condition wherein they have formed themselves in proximate and separate beads which because of their heated condition tend to shrink back and assume a cross section free of sharp corners and thus become defined by continuous rounded outer surfaces with some actually fused material on their outer and upper surfaces. In FIG. 14 the arrow A indicates movement of collar 20 towards the plunger 122 to move the softened end member margin or bead, now designated 15b, towards the softened side wall margin or bead, now designated 119b. It is noted that the bead 15b is pressed into the softened portions of rim 116 next adjacent bead 119b.

FIG. 15 illustrates the interfitting of the softened margins and their shape after they have been moved together upon full movement of collar 20. It is noted that the end member bead, now designated 119c overlies bead 15c and that the two beads are aligned at least partially axially of each other with their most softened portions in contact with each other. Thus far collar 20 has moved at least to the end of the body 11 so that the margins or beads 15 and 19 are disposed substantially within collar 20.

The next occurrence in the progression is the movement of sleeve 25′ in the direction of arrow B in FIG. 16 and towards the collar 20. This relative movement continues until the parts have attained the respective positions illustrated in FIG. 16, with marginal portions 15d and 119d in the interlocking position shown, after which the parts are held in that position until the beads and margins have united into a unitary sealed joint integrally connecting the end 112 to body 11.

It will be understood, of course, that in attaching both end members at the same time as heretofore described and as illustrated in FIG. 1, either one or both of these end members may be of the type designated by numeral 112, if desired, and may be attached by the method illustrated in FIGS. 12 to 16.

In FIG. 6 a further modification is illustrated wherein the free marginal area 219 of a rim 216 of an end member 212 includes a small outturned flange 219′ having transverse dimensions not much greater than the outside transverse dimensions of the body 11. End member 212 is joined or affixed to body 11 in the same manner as hereinabove described, that is by softening the margins 15 of body 11 and 219 of end member 212 and then pressing them together in the same manner as heretofore described. The presence of the flange 219′ is primarily to assist in determining the axial position of the end member during initial placement and does not significantly alter the reaction of the plastic margin to the process steps outlined above. The sequence of events will accordingly remain substantially as illustrated in FIGS. 8 to 11 even though the marginal material of the end member includes the material making up the small flange 219′.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

I claim:

1. A method of affixing a thermoplastic end member to an unstepped tubular body of thermoplastic material including the steps of providing an end member having a rim portion of a size to have a free sliding fit in the end of the body and a marginal seal portion arranged to be exposed axially of the body end when the rim portion is in place, positioning the end member at the body end with the rim portion therein and the marginal seal portion proximate to and externally exposed axially of the marginal portion of the body, heating directly and simultaneously the proximate marginal portions of the end member and body in an unconfined condition until they present softened axially displaced beads, applying a wiping force to said softened beads to effect an initial fusion thereof and thereafter while continuing to wipe said initially fused beads totalling confining the same to effect a completely fused unitary joint, and cooling the joint while the same is totally confined.

2. A method of affixing a thermoplastic end member to an unstepped tubular body of thermoplastic material including the steps of providing a thermoplastic end member with a disc portion and an axially etxending rim terminating in a marginal portion said rim having an outer surface conforming to the inner surface of the body, positioning the end member partially within the body and with the marginal portion of the rim proximate to the marginal portions of and externally of the body, heating directly and simultaneously the proximate marginal portions of the rim and body in an unconfined condition until they present axially displaced softened beads, applying a wiping force to said softened beads to effect an initial fusion thereof and thereafter while continuing to wipe said initially fused beads totalling confining the same to effect a completely fused unitary joint, and cooling the joint while the same is totally confined.

3. A method of affixing a thermoplastic end member to an unstepped tubular body of thermoplastic material including the steps of providing a thermoplastic end member having a disc portion, an axially extending rim portion and an intermediate radially extending marginal portion at the juncture of said disc portion and rim portion, said rim portion having an outer surface corresponding to the inner surface of the body, positioning the end member with its rim portion extending within the body and its marginal portion proximate to the marginal portion of and externally of the body and overlying the edge thereof, heating directly and simultaneously the proximate marginal portions of the end member and body in an unconfined condition until they present softened axially displaced beads, applying a wiping force to said softened beads to effect an initial fusion thereof and thereafter while continuing to wipe said initially fused beads totalling confining the same to effect a completely fused unitary joint, and cooling the joint while the same is totally confined.

4. A method of affixing a thermoplastic end member to an unstepped tubular body of thermoplastic material including the steps of providing an end member having a rim portion of a size to have a free sliding fit in the end of the body and a marginal seal portion arranged to be exposed axially of the body end when the rim portion is in place, positioning the end member at the body end with the rim portion therein and the marginal seal portion proximate to and externally exposed axially of the marginal portion of the body, heating directly and simultaneously the proximate marginal portions of the end member and body in an unconfined condition until they present softened axially displaced beads, axially moving from the direction of said body an annular wiping surface to substantially encompass said beads, while performing a pressing action thereon, axially moving from the opposite direction an annular stop cooperating with said wiping surface to confine and compress the material of the softened marginal portions in a predetermined space, and simultaneously cooling the marginal portions to cause them to set into a fused unitary joint affixing the end member to the body.

5. A method of affixing a thermoplastic end member to an unstepped tubular body of thermoplastic material including the steps of providing a thermoplastic end member with a disc portion and an axially extending rim terminating in a marginal portion, said rim having an outer surface conforming to the inner surface of the body, positioning the end member partially within the body and with the marginal portion of the rim proximate to the marginal portion of and externally of the body, heating directly and simultaneously the proximate marginal portions of the rim and body in an unconfined condition until they present axially displaced softened beads, axially moving from the direction of said body an annular wiping surface to substantially encompass said beads while performing a pressing action thereon, axially moving from the opposite direction an annular stop cooperating with said wiping surface to confine and compress the material of the softened marginal portions in a predetermined space, and simultaneously cooling the marginal portions to cause them to set into a fused unitary joint affixing the end member to the body.

6. A method of affixing a thermoplastic end member to an unstepped tubular body of thermoplastic material including the steps of providing a thermoplastic end member having a disc portion, an axially extending rim portion and an intermediate radially extending marginal portion at the juncture of said disc portion and rim portion, said rim portion having an outer surface corresponding to the inner surface of the body, positioning the end member with its rim portion extending within the body and its marginal portion proximate to the marginal portion of and externally of the body and overlying the edge thereof, heating directly and simultaneously the proximate marginal portions of the end members and body in an unconfined condition until they present softened axially displaced beads, axially moving from the direction of said body an annular wiping surface to substantially encompass said beads while performing a pressing section thereon, axially moving from the opposite direction an annular stop cooperating with said wiping surface to confine and compress the material of the softened marginal portions in a predetermined space, and simultaneously cooling the marginal portions to cause them to set into a fused unitary joint affixing the end member to the body.

7. A method of forming a container comprising the steps of forming an unstepped tubular thermoplastic body having a marginal portion at its end, providing an end member having a rim portion of a size to have a free sliding fit in the end of the body and a marginal seal portion arranged to be exposed axially of the body end when the rim portion is in place, mounting the end member on the end of a plunger, positioning the plunger in axial alignment with said body with the end member disposed with its rim portion therein and the marginal seal portion proximate to and externally of the marginal portion of the body, heating directly and simultaneously the proximate marginal portions of the end member and body in an unconfined condition to render them soft and weldable, axially moving from the direction of said body an encompassing collar and from the direction of said plunger a plunger encircling sleeve, pressing said collar and sleeve axially together in the vicinity of said softened marginal portions to confine and compress the material thereof, and simultaneously cooling the marginal portions to cause them to set into a fused unitary joint affixing the end member to the body.

8. A method of forming a container comprising the steps of forming an unstepped tubular thermoplastic body having a marginal portion at its end, providing an end member having a rim portion of a size to have a free sliding fit in the end of the body and a marginal seal portion arranged to be exposed axially of the body end when the rim portion is in place in the body, positioning the end member at the body end with the rim portion therein and the marginal seal portion proximate to and externally exposed axially of the marginal portion of the body, heating directly and simultaneously the proximate marginal portions of the end member and body in an unconfined condition until they present axially displaced softened beads with the body bead having a slight outward projection beyond the body periphery, sliding a close-fitting annular wiping surface endwise of the body to substantially encompass the beads and cause the softened body bead to swing inwardly and intrude itself into the softened plastic of the end member bead, and thereafter sliding an annular stop axially into engagement with the softened end member bead to squeeze both beads into an interlocking configuration having a substantially transaxial interface and pressing and confining the beads until they cool to provide a fused unitary joint.

References Cited in the file of this patent

UNITED STATES PATENTS

| | | |
|---|---|---|
| 2,678,471 | Barton | May 18, 1954 |
| 2,679,469 | Bedford | May 25, 1954 |
| 2,922,192 | Morin | Jan. 26, 1960 |
| 2,922,832 | Gottschall et al. | Jan. 26, 1960 |

FOREIGN PATENTS

| | | |
|---|---|---|
| 305,493 | Switzerland | May 2, 1955 |